UNITED STATES PATENT OFFICE.

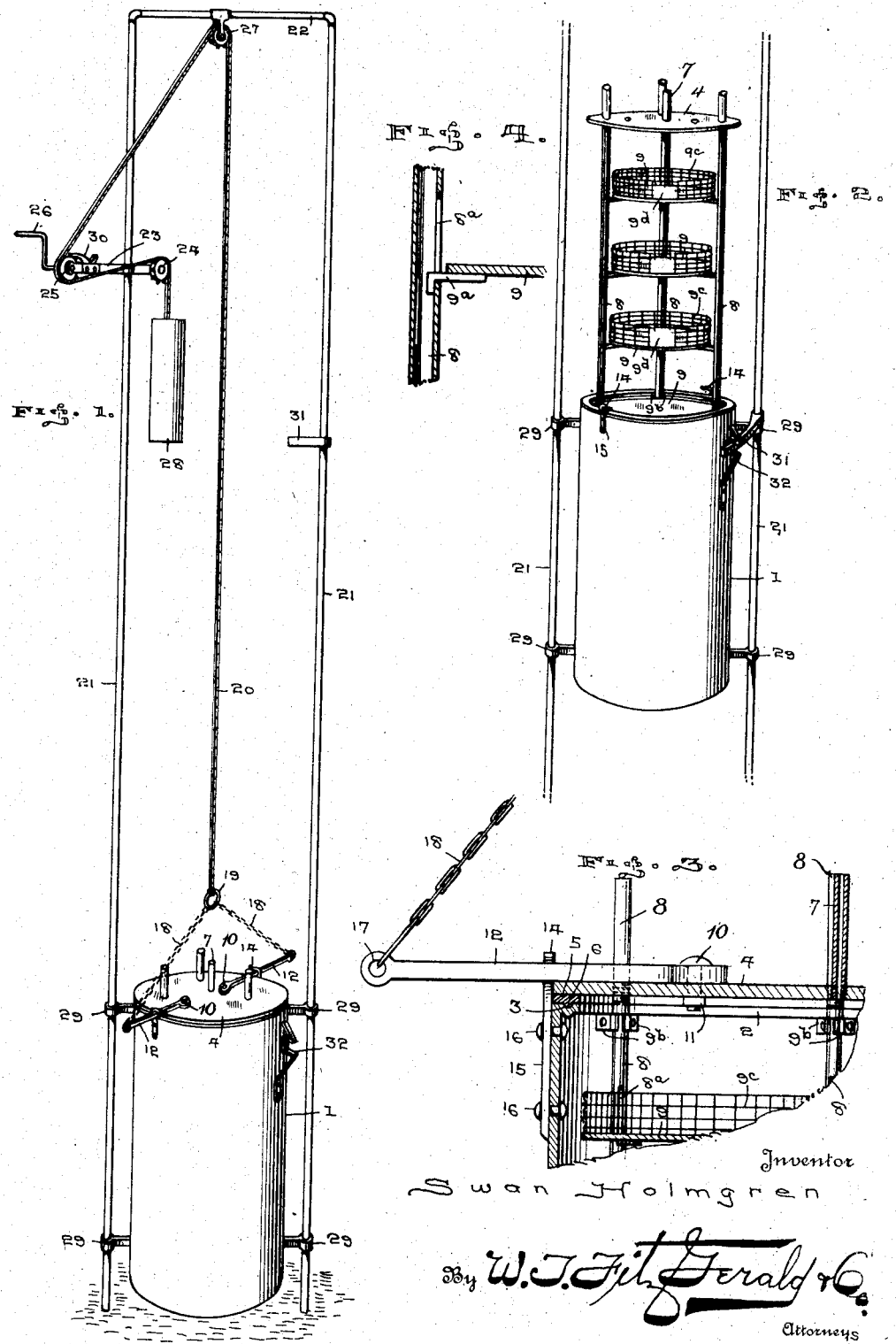

SWAN HOLMGREN, OF VAN ORIN, ILLINOIS.

FOOD-CONTAINER.

1,249,756.  Specification of Letters Patent.  Patented Dec. 11, 1917.

Application filed December 30, 1916. Serial No. 139,989.

*To all whom it may concern:*

Be it known that I, SWAN HOLMGREN, a citizen of the United States, residing at Van Orin, in the county of Bureau and State of Illinois, have invented certain new and useful Improvements in Food-Containers; and I do hereby declare the following to be a full, clear, and exact description of the invention, such as will enable others skilled in the art to which it appertains to make and use the same.

This invention relates to a food container in which food is designed to be placed for refrigerating purposes.

The principal object of the invention is the provision of a food container of the above stated character which is designed to be lowered into a cistern or other water storage means, and if desired lowered down into the water therein so as to effectively keep the food contents of the container cool and in a sanitary manner.

Another object of the invention is to provide means for readily and quickly raising the container from the cistern whereby it may be securely held at the surface of the ground while the food contents are being removed.

Another object of the invention is to provide a sprocket chain, one end of which is connected to the food container, while the other end is connected to a counter-balancing weight, and winding means for coöperating with the chain for raising and lowering the receptacle.

A still further object of the invention is to provide the container with a vertically movable frame work comprising a plurality of pipes that are supported from and extend through the container cover, each of said pipes being provided with a vertical row of slots adapted to receive the shelf supporting hooks carried by a plurality of superimposed and detachably mounted shelves, said pipes and slots permitting of a free circulation of air through the cover, pipes and the slots thereof, whereby the air admitted to the receptacle may circulate freely between and around the outer edges of the shelves.

A still further object of the invention is to provide means for holding the receptacle in elevated position whereby the winding means may be actuated to elevate the shelves out of the container.

With these and other objects in view as will appear as the description proceeds, the invention comprises the various novel features of construction, combination and arrangement of parts as will be more fully described hereinafter and set forth with particularity in the appended claims.

Referring to the drawings,

Figure 1 is a perspective view of my improved food container and the means for raising and lowering the same into and out of a cistern or other water storage cistern.

Fig. 2 is a perspective view of the food container showing the food supporting shelves elevated out of the food container casing.

Fig. 3 is a fragmentary vertical sectional view showing the manner in which the container cover is clamped upon the container.

Fig. 4 is a detail vertical sectional view showing the manner in which the food supporting shelves are detachably supported in the slots of the supporting pipes.

Similar characters of reference are used to denote like parts throughout the accompanying drawings and the following description.

Referring more particularly to the drawings, my improved construction of food container is shown to consist of a casing 1 which may be of cylindrical or any other desired formation, and the upper circumferential edge of it is provided with an inwardly and radially extending flange 2 which is formed in its upper surface with an annular groove 3.

In order to close the upper end of the casing 1, I provide a cover 4 which is provided at its circumferential edge with a gasket 5 which may or may not be provided with an annular bead 6 as found best suited for the purpose. If no bead is provided, the cover is clamped downwardly upon the casing 1 sufficiently to compress and force the gasket or portions thereof into the annular groove 3, thus providing a hermetical seal between the circumferential edges of the cover and the casing.

The cover is provided centrally with a vent pipe 7, which extends a suitable distance above it.

The cover also has connected to it a plurality of supporting pipes 8 which are spaced around its circumference and are designed to detachably support a plurality of food supporting shelves 9 in spaced relation to each other and to the cover. The upper ends of these pipes are extended through the cover in any suitable manner, and preferably by a screw threaded end, each pipe extending a suitable distance above the cover.

Each of the pipes 8 is provided with a vertical row of slots 8$^a$ which are designed to receive the shelf supporting hooks 9$^a$ rigidly attached to each shelf. These pipes and food supporting shelves, together with the cover, form a structure which is separate from the casing and is designed to be vertically slid into and out of the casing 1.

The pipes 8 are mounted for vertical sliding movement in guides 9$^b$ attached to the inner surface of the casing 1.

As shown each of the shelves has a screen guard 9$^c$ extending around its circumferential edge which is provided with a hand opening 9$^d$.

In order to clamp the cover upon the casing, I provide a pair of clamping levers 12 having their inner ends pivotally connected to the cover by bolts 10 which extend through the cover and are secured in place by nuts 11. The outer ends of the levers are adapted to be moved laterally into clamping position beneath hooks 14 that have their shank portions 15 securely attached to the outer surface of the casing 1 by rivets or other suitable fastening means 16. The under surface of each of these hooks 14 is slightly rounded so that as the clamping arms are moved laterally beneath them, the gasket 5 will be compressed sufficiently to form a hermetical seal between the cover and the top edge of the casing.

When the cover has been clamped into position upon the casing, it will be obvious that by reason of the pipes 8 extending through and above the cover, air may circulate freely through the pipes and out through the slots 8$^a$ into the interior of the casing where the air is then free to circulate between and around the shelves. The air not only will circulate through the pipes 8 but will also circulate through the vent pipe 7 mounted centrally of the cover.

As before stated the food container is designed to be lowered into a cistern, well, or other water storage means, and in order to accomplish this, I position a suitable frame work within the well which consists in this instance of a pair of spaced vertically disposed guide rods 21, that extend from the bottom of the cistern to a suitable point above the surface of the ground and are connected at their upper ends by a cross bar 22.

Mounted upon one of the guide rods 21 is a horizontally disposed supporting arm 23 which has mounted at one end a sprocket wheel 24 and at its opposite end a sprocket wheel 25, this latter sprocket wheel having connected to it an operating handle 26.

A sprocket chain 20 has its lower end attached to the ring 19 while its upper end is carried upwardly and over a pulley 27 that is supported by the cross bar 22 intermediate its ends, and is then continued downwardly around beneath the sprocket wheel 25 and thence over and downwardly from the sprocket wheel 24, the terminal end of which is connected to a counterbalancing weight 28. The outer ends of the clamping levers are apertured as at 17, and have connected thereto chains 18 which are in turn attached to a connecting ring 19.

The food container or casing 1 is designed to be supported between the guide rods 21 through the medium of pairs of spaced guide arms 29 that are attached to the opposite ends of the casing and are slidably mounted at their opposite ends upon the guide rods 21.

By this construction and arrangement it will be apparent that by rotating the handle 26, the food container may be readily lowered into the cistern or raised out of it as desirable, the counterbalancing weight 28 serving to assist in preventing a too rapid descending of the container into the cistern.

In order that the food container may be held in any desired lowered position within the cistern, irrespective to the amount of weight therein, I provide a dog or latch 30 that is pivotally mounted upon the arm 23 and is adapted to engage the teeth of the sprocket wheel 25 to prevent rotation thereof.

In order that the food container may be held in an elevated position, I provide a spring latch arm 31 that is mounted upon one of the guide rods 21 and is adapted to automatically engage a keeper 32 when the device has been elevated to the proper position.

When the device has been latched in this elevated position, the clamping arms 12 may be moved laterally so as to release or disconnect the lid from the casing, whereupon the handle 26 may be continued in rotation so as to elevate the cover and the food supporting shelves supported thereby, out of the casing 1 into a position where free access may be had to the food arranged upon the shelves.

It is to be further understood that by virtue of the chains 18 being connected to the outer ends of the levers 12, pressure will be brought to bear on the cover at the inner ends of the levers, thus urging the cover into contact with the casing and forming a better seal therebetween.

What I claim is:—

1. A food container comprising a casing, a cover for said casing, means for clamping the cover upon said casing, and means connected to said clamping means for supporting the casing for vertical movement whereby said clamping means will act to additionally clamp said cover upon the casing under the weight of said container 2. A food container comprising a casing, a cover for said casing, a gasket adapted to be positioned between the cover and said casing, means for clamping the cover down upon the casing so as to compress the gasket to form a water tight joint, and means connected to said clamping means for supporting the casing for vertical movement whereby said clamping means will act to further clamp the cover on said casing under the weight of said container.

3. A food container comprising a casing, a cover for said casing, means for clamping the cover on said casing, a plurality of pipes having their upper ends extending through said cover and rigid therewith, said pipes being provided longitudinally below the cover with a plurality of slots, whereby air may circulate into and out of the casing through said pipes, and shelves having supporting hooks adapted to be detachably engaged within said pipe slots to support said shelves.

4. A food container comprising a casing having a lateral flange at its open end, a cover for said casing, a gasket positioned between said cover and lateral flange, vertically disposed hooks attached diametrically to said casing, clamping levers having their inner ends pivoted on said cover and having horizontal swinging movement, said levers adapted to be moved into clamping engagement beneath said hooks, and supporting means connected to the outer ends of said clamping levers.

5. A food container comprising a casing, a cover for said casing, means for clamping said cover on said casing, a vent pipe mounted centrally of said cover and extending above it, a plurality of pipes having their upper ends extended through said cover and rigid therewith, said second named pipes arranged adjacent the peripheral edge of the cover and provided longitudinally below the cover with a plurality of slots, whereby air may circulate into and out of the casing through said pipes and said central vent pipe, and a plurality of shelves supported by said pipes below the cover.

In testimony whereof I have signed my name to this specification in the presence of two subscribing witnesses.

SWAN HOLMGREN.

Witnesses:
GLENN WILLIAMS,
MARK WILLIAMS.

Copies of this patent may be obtained for five cents each, by addressing the "Commissioner of Patents, Washington, D. C."